United States Patent [19]

Ewen et al.

[11] Patent Number: 4,937,299

[45] Date of Patent: * Jun. 26, 1990

[54] PROCESS AND CATALYST FOR PRODUCING REACTOR BLEND POLYOLEFINS

[75] Inventors: John A. Ewen; Howard C. Welborn, Jr., both of Houston, Tex.

[73] Assignee: Exxon Research & Engineering Company, Florham Park, N.J.

[*] Notice: The portion of the term of this patent subsequent to Jul. 23, 2002 has been disclaimed.

[21] Appl. No.: 697,308

[22] Filed: Feb. 1, 1985

Related U.S. Application Data

[63] Continuation of Ser. No. 501,587, Jun. 6, 1983, abandoned.

[51] Int. Cl.$^5$ .......................... C08F 4/66; C08F 10/02
[52] U.S. Cl. ..................... 526/119; 502/113; 502/117; 502/129; 526/114; 526/116; 526/160; 525/240
[58] Field of Search ................. 502/113; 526/114, 116, 526/119, 160

[56] References Cited

U.S. PATENT DOCUMENTS

| | | | |
|---|---|---|---|
| 3,104,249 | 9/1963 | Clauss et al. | 526/160 |
| 4,210,559 | 7/1980 | Melquist et al. | |
| 4,396,533 | 8/1983 | Johnstone | |
| 4,404,344 | 9/1983 | Sinn et al. | 526/351 |
| 4,530,914 | 7/1985 | Ewen et al. | 526/160 |
| 4,542,199 | 9/1985 | Kaminsky et al. | 526/160 |

FOREIGN PATENT DOCUMENTS 69951 1/1983 European Pat. Off. ............ 526/160

OTHER PUBLICATIONS

Sinn et al., Advances in Organometallic Chemistry, vol. 18 (1980), pp. 123–143.
Copolymerization, High Polymers Sines, vol. XVIII, J. Witey & Sons, N.Y. (1964) (Lukach et al.), pp. 115–123, 126, 127, 138–140.
John Boor, Jr., *Ziegler–Natta Catalysts and Polymerizations*, Academic Press, New York, 1979.
C. A. Lukach and H. M. Spurlin, *Copolymers of Alpha-Olefins*, pp. 115–140, Research Center, Hercules Powder Company, Wilmington, Del.
D. R. Paul and Seymour Newman, *Polymer Blends*, vol. 2, New York, Academic Press, 1978, pp. 83, 330.
H. Hocker and K. Saeki, "Polymerisation of Ethylene with Soluble Ziegler-Natta Catalysts", May, 1971, pp. 107–119, Mainz, Germany.
George L. Karapinka and Wayne L. Carrick, "Transition Metal Catalysts VI. Bis-(cyclopentadienyl) Transition Metal Polymerization Catalysts", 1961, pp. 145–150, Bound Brook, N.J.
Boor, John Jr., *Ziegler–Natta Catalysts and Polymerizations*, Academic Press, 1979, p. 116, New York, N.Y.

Primary Examiner—Edward J. Smith
Attorney, Agent, or Firm—M. B. Kurtzman

[57] ABSTRACT

Polyolefin reactor blends obtained by polymerization of ethylene and higher alpha-olefins in the presence of a catalyst system comprising two or more metallocenes and alumoxane.

17 Claims, No Drawings

PROCESS AND CATALYST FOR PRODUCING REACTOR BLEND POLYOLEFINS

This is a continuation of application Ser. No. 501,587, filed 6/6/83, now abandoned.

The present invention concerns catalyst and process for the polymerization of ethylene and alpha-olefins. More particularly, the invention relates to catalysts and process for producing (co)polyolefin reactor blends of ethylene and ethylene-alpha-olefin copolymers. The invention further relates to a process for producing tailored (co)polyolefins reactor blends through the proper selections of the catalysts of this invention.

Reactor blends for purposes of this invention are mixtures of two or more polymers of different physical properties (density, melting point, comonomer content, etc.) produced simultaneously in a single polymerization reactor Catalyst employed in the production of such polymer blends under steady state conditions in one reactor will comprise two or more distinct catalyst components, one predominately catalyzing the formation of one polymer, the other predominately catalyzing the formation of the other polymer.

DESCRIPTION OF THE PRIOR ART

It is known that certain metallocenes such as bis(cyclopentadienyl) titanium and zirconium dialkyls in combination with aluminum alkyl co-catalyst, form homogeneous catalyst systems useful for the polymerization of ethylene. German Patent Application No. 2,608,863 discloses the use of a system for the polymerization of ethylene consisting of bis(cyclopentadienyl) titanium dialkyl, aluminum trialkyl and water. German Patent Application No. 2,608,933 discloses an ethylene polymerization catalyst system consisting of (1) zirconium metallocenes of the general formula (cyclopentadienyl)$_n$ZrY$_{4-n}$, wherein n stands for a number in the range of 1 to 4, Y for R, CH$_2$AlR$_2$, CH$_2$CH$_2$AlR$_2$ and CH$_2$CH(AlR$_2$)$_2$ wherein R stands for alkyl or metallo alkyl, (2) an aluminum trialkyl cocatalyst and (3) water European Patent Appln. No. 0035242 discloses a process for preparing ethylene and atactic propylene polymers in the presence of a halogen-free Ziegler catalyst system of (1) cyclopentadienyl compound of the formula (cyclopentadienyl)$_n$MeY$_{4-n}$ in which n is an integer from 1 to 4, Me is a transition metal, especially zirconium, and Y is either hydrogen, a C$_1$–C$_5$ alkyl or metallo alkyl group or a compound having the following general formula: CH$_2$AlR$_2$, CH$_2$CH$_2$AlR$_2$ and CH$_2$CH(AlR$_2$)$_2$ in which R represents a C$_1$–C$_5$ alkyl or metallo alkyl group, and (2) an alumoxane.

The above disclosures demonstrate the usefulness of certain metallocenes in combination with certain aluminum compounds for the polymerization of ethylene and particularly polymerization at a high activity rates. The references neither disclose polyethylene/copolyethylene-alpha-olefin reactor blends nor methods of producing such reactor blends.

In "Molecular Weight Distribution And Stereoregularity Of Polypropylenes Obtained With Ti(OC$_4$H$_9$)$_4$Al(C$_2$H$_5$)$_3$ Catalyst System"; *Polymer*, Pg. 469–471, 1981, Vol. 22, April, Doi, et al disclose propylene polymerization with a catalyst which at about 41° C. obtains a soluble catalyst and insoluble catalyst fraction, one with "homogeneous catalytic centres" and the other with "heterogeneous catalytic centres". The polymerization at that temperature obtains polypropylene having a bimodal molecular weight distribution.

It is also known to produce polymer blends by polymerizing two or more polymerizable materials in two or more reactors arranged in series. In accordance with such methods, a polymerizate is produced in a first reactor which first polymerizate is passed to a second reactor wherein a second polymerizate is produced thereby obtaining a blend of the first and second polymerizates.

It is highly desirable to be able to readily and simply produce blends in a single reactor during which polyethylene and copolyethylene-alpha-olefins are produced simultaneously Not only is a significant reduction in energy costs obtained, but one obtains a uniform blending of the polymers and one can simply "tailor" the polymers with respect to molecular weights, weight fraction and the like to obtain blends evidencing outstanding properties.

In view of the foregoing problems, it would be highly desirable to provide a polymerization catalyst system of sufficient activity to produce high quality blends of ethylene-alpha olefin polymers It is furthermore highly desirable to be able to produce the blends of ethylene-alpha olefin polymers directly in a single reactor.

SUMMARY OF THE INVENTION

The present invention provides a process for producing (co)polyolefin reactor blends comprising polyethylene and copolyethylene-alpha-olefins. The reactor blends are obtained directly during a single polymerization process, i.e., the blends of this invention are obtained in a single reactor by simultaneously polymerizing ethylene and copolymerizing ethylene with an alpha-olefin thereby eliminating expensive blending operations The invention furthermore provides a catalyst system for the polymerization of ethylene and ethylene copolymers simultaneously to provide polyethylene blends. The process of producing reactor blends in accordance with this invention can be employed in conjunction with other prior art blending techniques, for example the reactor blends produced in a first reactor can be subjected to further blending in a second stage by use of the series reactors Accordingly, there is provided a catalyst system for the polymerization of reactor blends of polyethylene with ethylene-alpha-olefin copolymers; said catalyst system comprising (a) at least two different metallocenes and (b) an alumoxane. The metallocenes employed in this invention are organometallic coordination compounds which are cyclopentadienyl derivatives of a transition metal of Groups 4b, 5b and 6b and include mono, di and tricyclopentadienyls and their derivatives of the transition metal The metallocenes can be represented by the general formula (C$_5$R'$_m$)$_p$R''$_s$(C$_5$R'$_m$)MeQ$_{3-p}$ or R''$_s$(C$_5$/R'$_m$)$_2$MeQ', wherein (C$_5$R'$_m$) is a cyclopentadienyl or substituted cyclopentadienyl, each R', which can be the same or different, is hydrogen or a hydrocarbyl radical such as alkyl, alkenyl, aryl, alkylaryl, or arylalkyl radical having from 1 to 20 carbon atoms or two carbon atoms are joined together to form a C$_4$–C$_6$ ring, R'' is a C$_1$–C$_4$ alkylene radical, a dialkyl germanium or silicone, or an alkyl phosphine or amine radical bridging two (C$_5$R'$_n$) rings, Q is a hydrocarbon radical such as aryl, alkyl, alkenyl, alkylaryl, or arylalkyl radical having from 1 to 20 carbon atoms or halogen and can be the same or different, Q' is an alkylidene radical having from 1 to about 20 carbon atoms, Me is a transition metal of Group 4b, 5b, 6b of the Periodic Table (Chemical Rubber Company's Handbook of Chemistry & Physics, 48th Edition), s is 0 or 1, p is 0, 1 or 2; when p=0, s=0; m is 4 when s is 1 and m is 5 when s is 0.

The ratios of one metallocene to the second metallocene will be a function of both the chemical composition of the metallocenes as well as the blend being tailored., accordingly, the ratio of the two metallocenes can vary greatly and, hence, is limited only for the purpose of producing the blends.

The present invention also provides a process for producing polyolefin reactor blends. The process comprises polymerizing ethylene and higher alpha-olefins in the presence of the catalyst system described above.

DETAILED DESCRIPTION OF THE INVENTION

The present invention is directed towards a catalytic process for the polymerization of ethylene and one or more alpha-olefins to polyethylene-copolyethylene-alpha-olefin reactor blends. The polymers are intended for fabrication into articles by extrusion, injection molding, thermoforming, rotational molding, and the like. In particular, the polymer blends of this invention are blends of polyethylenes such as high density polyethylene (HDPE) and linear low density polyethylene (LLDPE) and with copolyethylene higher alpha-olefins having from 3 to about 10 carbon atoms and preferably 4 to 8 carbon atoms Illustrative of the higher alpha-olefins are propylene, butene-1, hexene-1 and octene-1. Preferably, the alpha-olefin is propylene or butene-1.

In the process of the present invention, ethylene, together with the alpha-olefins, is polymerized in the presence of a homogeneous catalyst system comprising at least two different metallocenes and an alumoxane.

The alumoxanes are well known in the art and are polymeric aluminum compounds which can be represented by the general formulae $(R-Al-O)_n$ which is a cyclic compound and $R(R-Al-O)_n AlR_2$, which is a linear compound. In the general formula R is a $C_1-C_5$ alkyl group such as, for example, methyl, ethyl, propyl, butyl and pentyl and n is an integer from 1 to about 20 and preferably from about 1 to about 4. Most preferably, R is methyl and n is 4. Generally, in the preparation of alumoxanes from, for example, aluminum trimethyl and water, a mixture of the linear and cyclic compounds are obtained.

The alumoxane can be prepared in various ways. Preferably, they are prepared by contacting water with solution of aluminum trialkyl, such as, for example, aluminum trimethyl, in a suitable organic solvent such as benzene or an aliphatic hydrocarbon. For example, the aluminum alkyl is treated with water in form of a moist solvent or the aluminum alkyl such as aluminum trimethyl can be desirably contacted with a hydrated salt such as hydrated copper sulfate.

Preferably, the alumoxane is prepared in the presence of a hydrated copper sulfate. The method comprises treating a dilute solution of aluminum trimethyl in, for example, toluene, with copper sulfate represented by the general formula $CuSO_4.5H_2O$. The ratio of copper sulfate to aluminum trimethyl is desirably about 1 mole of copper sulfate for 5 moles of aluminum trimethyl.The reaction is evidenced by the evolution of methane.

The dual metallocene system usefully employed in accordance with this invention are the mono, di and tricyclopentadienyl or substituted cyclopentadienyl metallocenes and preferably the titanium (IV) and zirconium (IV) metallocenes. The metallocenes are represented by the general formula $(C_5R'_m)_p R''_s (C_5R'_m) MeQ_{3-p}$ and $R''_s (C_5R'_m)_2 MeQ'$ wherein $(C_5R'_n)$ is cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms or two carbon atoms are joined together to form a $C_4-C_6$ ring, R" is a $C_1-C_4$ alkylene radical, a dialkyl germanium or silicone, or an alkyl phosphine or amine radical bridging two $(C_5R'_n)$ rings, Q is a hydrocarbyl radical such as aryl, alkyl, alkenyl, alkylaryl, or arylalkyl radical having from 1–20 carbon atoms or halogen and can be the same or different, Q' is an alkylidene radical having from 1 to about 20 carbon atoms, s is 0 or 1, p is 0, 1 or 2; when p is 0, s is 0, m is 4 when s is 1 and m is 5 when s is 0 and Me is a Group 4b, 5b or 6b transition metal and most preferably zirconium or titanium.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like.

Exemplary alkylene radicals are methylene, ethylene, propylene, and the like.

Exemplary halogen atoms include chlorine, bromine and iodine and of these halogen atoms, chlorine is preferred.

Exemplary of the alkylidene radicals are methylidene, ethylidene and propylidene.

Illustrative but non-limiting examples of the titanocenes which can be usefully employed in accordance with this invention are bis(cyclopentadienyl) titanium diphenyl, the carbene represented by the formula $Cp_2Ti=CH_2.Al(CH_3)_2Cl$, and derivatives of this reagent such as $Cp_2Ti=CH_2.Al(CH_3)_3$, $(Cp_2TiCH_2)_2$, $Cp_2I:CH_2CH(CH_3)CH_2$, $Cp_2Ti=CHCH_2CH_2$, $\overline{Cp_2Ti=CH_2.AlR'''_2Cl}$, wherein Cp is a cyclopentadienyl or substituted cylopentadienyl radical, and R''' is an alkyl, aryl or alkylaryl radical having from 1–18 carbon atoms; substituted bis(Cp)Ti(IV) compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds such as bis(1,2-dimethylcyclopentadienyl)Ti diphenyl or dichloride, bis(fluorenyl)Ti dichloride, bis(1,2-diethylcyclopentadienyl)Ti diphenyl or dichloride and other dihalide complexes; silicone, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes.

Illustrative but non-limiting examples of the zirconocenes which can be usefully employed in accordance with this invention are bis(cyclopentadienyl)zirconium diphenyl, bis(cyclopentadienyl)zirconium dimethyl; the alkyl substituted cyclopentadienes, such as bis(ethyl cyclopentadienyl)zirconium dimethyl, bis(si-phenyl-propylcyclopentadienyl)zirconium dimethyl, bismethylcyclopentadienyl)zirconium dimethyl and dihalide complexes of the above; di-alkyl, tri-alkyl, 36 tetra-alkyl, and penta-alkyl cyclopentadienes, such as bis(pentamethylcyclopentadienyl)zirconium dimethyl, bis (1,2-dimethylcyclopentadienyl)zirconium dimethyl, bis(1,3-diethylcyclopentadienyl)zirconium dimethyl, and dihalide complexes of the above, silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2Zr_2CH(CH_3)CH_2$.

The ratio of aluminum in the alumoxane to total metal in the metallocenes can be in the range of about 0.5:1 to about $10^5$:1, and preferably about 5:1 to about 1000:1. The molar ratio of the metallocenes can vary over a wide range and in accordance with this invention the molar ratios are controlled by the product polymer blend desired.

The reactivity ratios of the metallocenes in general are obtained by methods well known such as, for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

$$M_1^* + M_1 \xrightarrow{k_{11}} M_1^* \quad (1)$$

$$M_1^* + M_2 \xrightarrow{k_{12}} M_2^* \quad (2)$$

$$M_2^* + M_1 \xrightarrow{k_{21}} M_1^* \quad (3)$$

$$M_2^* + M_2 \xrightarrow{k_{22}} M_2^* \quad (4)$$

where $M_i$ refers to a monomer molecule which is arbitrarily designated i where i=1, 2) and $M_2^*$ refers to a growing polymer chain to which monomer i has most recently attached The kij values are the rate constants for the indicated reactions. Thus, $k_{11}$ represents the rate at which an ethylene unit inserts into a growing polymer chain in which the previously inserted monomer unit was also ethylene. The reactivity rates follow as: $r_1 k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1x}$) or propylene ($k_{2x}$).

In Table I the ethylene-propylene reactivity rates $r_1$ and $r_2$ are listed for several metallocenes It can be seen that with increased steric interaction at the monomer coordination site $r_1$ increases, i.e. the tendency for ethylene polymerization increases over propylene polymerization.

It can be seen from Table I that if one desires a blend comprising HDPE/ethylene-propylene copolymer one would select bis(pentamethylcyclopentadienyl)ZrCl$_2$ and bis(cyclopentadienyl)Ti diphenyl or dimethylsilyldicyclopentadienyl zirconium dichloride in ratios of about 5:1 to about 1:1 whereas if one desires a blend comprising LLDPE/ethylene-propylene one would select bis(cyclopentadiethyl)Zr dimethyl or bis(methylcyclopentadienyl)ZrCl$_2$ and bis(cyclopentadienyl)Ti diphenyl or dimethylsilyldicyclopentadienyl ZrCl$_2$ in ratios of about 10:1 to about 1:1.

Desirably, the metallocene molar ratio will be about 100:1 to about 1:100, and preferably 10:1 to about 1:10. The specific metallocenes selected and their molar ratios are depended upon the molecular composition desired for the component polymers and the overall composition desired for the blend In general, the component catalyst used in a reactor blend catalyst mixture will each have r values which are different in order to produce final polymer compositions which comprise blends of two or more polymers.

TABLE I

| Catalyst | $r_1$ | $r_2$ |
|---|---|---|
| $Cp_2Ti=CH_2.Al(Me)_2Cl$ | 24 | 0.0085 |
| $Cp_2TiPh_2$ | 19.5 ± 1.5 | 0.015 ± .002 |
| $Me_2SiCp_2ZrCl_2$ | 24 ± 2 | 0.029 ± .007 |
| $Cp_2Zr\ Cl_2$ | 48 ± 2 | 0.015 ± .003 |
| $(MeCp)_2ZrCl_2$ | 60 | |
| $(Me_5Cp)_2ZrCl_2$ | 250 ± 30 | .002 ± 0.001 |
| $[Cp_2ZrCl]_2O$ | 50 | 0.007 |

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

The catalyst systems described herein are suitable for producing polymer product blends in solution, slurry or a gas phase polymerizations and over a wide range of temperatures and pressures. For example, such temperatures may be in the range of about $-60°$ to about $280°$ C. and especially in the range of about $50°$ to about $160°$ C. The pressures employed in the process of the present invention are those well known for example, in the range of about 1 to about 500 atmospheres and greater.

In a solution phase polymerization the alumoxane and metallocene can be employed as a homogeneous catalyst system. The alumoxane is preferably dissolved in a suitable solvent, typically in inert hydrocarbon solvent such as toluene, xylene, and the like in molar concentrations of about 0.1 to 3.0, however greater or lesser amounts can be employed.

The soluble metallocenes can be converted to supported heterogeneous catalyst by depositing said metallocenes on typical catalyst supports such as, for example, silica, alumina, and polyethylene. The solid catalysts in combination with an alumoxane can be usefully employed in slurry and gas phase olefin polymerizations.

After polymerization and deactivation of the catalyst, the product polymer blend can be recovered by processes well known in the art for removal of deactivated catalysts and solution The solvents may be flashed off from the polymer solution and the polymer obtained extruded into water and cut into pellets or other suitable comminuted shapes.

Pigments, antioxidants and other additives, as is known in the art, may be added to the polymer.

The polymer product obtained in accordance with this invention will have a weight average molecular weight in the range of about 500 to about 2,000,000 and preferably 10,000 to about 500,000. The component polymers in the reactor blend can have the same or different average molecular weights and comonomer composition; however, it is preferable for most end uses that the average molecular weights and comonomer composition be different.

Illustrative, but nonlimiting examples of reactor blends which can be produced in accordance with this invention are HDPE/EPR copolymer, LLDPE/EPR copolymer, HDPE/LLDPE and HDPE/LLDPE/EPR copolymer blends These polymers demonstrate superior properties such as for example impact resistance and tear strength and process more easily than the individual component polymers.

The polymers produced by the process of this present invention are capable of being fabricated into a wide variety of articles, as is known for blend of ethylene and copolymers of ethylene and higher alpha-olefins The present invention is illustrated by the following examples.

EXAMPLES

In the examples following the molecular weights were determined on a Water's Associates Model No. 150C GPC. The measurements were made by dissolving polymer samples in hot trichlorobenzene (TCB) and filtered The GPC (Gel Permeation Chromatography) runs were performed at 145° C. in TCB at 1.5 ml/min using two Shodex A80M/S columns of 9.4 mm internal diameter from Perkins Elmer Inc. 300 milliliter of 3.1 percent solutions in TCB were injected and the chromatographic runs monitored at sensitivity equal −64 and scale factor equal 65. The samples were run in duplicate The integration parameters were obtained with a Water's Associates data module. An antioxidant, N-phenyl-2-naphthylamine, was added to all samples.

In the examples following the alumoxane was prepared in the following manner:

600 cc of a 14.5% solution of trimethylaluminum (TMA) in heptane was added in 30 cc increments at 5 minute intervals, with rapid stirring, to 200 cc toluene in a Zipperclave reactor under nitrogen and maintained at 100° C. Each increment was immediately followed by the addition of 0.3 cc water. The reactor was vented of methane after each addition. Upon completion of the addition, the reactor was stirred for 6 hours while maintaining the temperature at 100° C. The mixture, containing soluble alumoxane is allowed to cool to room temperature and settle The clear solution containing the soluble alumoxane is separated by decantation from the solids.

EXAMPLE 1(a)

Reactor blend

A 1-liter stainless steel pressure vessel, equipped with an incline blade stirrer, an external water jacket for temperature control, a septum inlet and vent line, and a regulated supply of dry ethylene, propylene and nitrogen, was dried and deoxygenated with a nitrogen flow. 400 cc of dry, degassed toluene was introduced directly into the pressure vessel. 25 cc of 0.64 molar (in total aluminum) alumoxane was injected into the vessel by a gas tight syringe through the septum inlet and the mixture was stirred at 1,200 rpms and 50° C. for 5 minutes at zero (0) psig of nitrogen. 1.12 mg bis(cyclopentadienyl) titanium phenyl dissolved in 2.0 ml of dry, distilled toluene was injected through the septum inlet into the vessel. Similarly, 0.107 mg. bis(pentamethylcylcopentadienyl) zirconium dimethyl in 2.0 ml dry, distilled toluene was injected. The solution was saturated with 200 cc propylene at a pressure of 165 psig. Thereafter ethylene at 25 psig was passed into the vessel for 60 minutes while maintaining the temperature at 50° C. at which time the reaction was stopped by rapidly venting and cooling. The copolymer was evaporated to dryness, weighed and analyzed by GPC and IR. 62 gms of a blend of polyethylene and EPR copolymer which analyzed for 6 mole % propylene and having a $\overline{M}n$ of 16,500 and a $\overline{M}w$ of 41,800 was recovered.

EXAMPLE 1(b)

Use of One Metallocene-bis(pentamethylcyclopentadienyl)Zirconiumdimethyl

A 1-liter stainless steel pressure vessel, equipped with an incline blade stirrer, an external water jacket for temperature control, a septum inlet and vent line, and a regulated supply of dry ethylene, propylene and nitrogen, was dried and deoxygenated with a nitrogen flow. 400 cc of dry, degassed toluene was introduced directly into the pressure vessel. 25 cc of 0.64 molar (in total aluminum) alumoxane was injected into the vessel by a gas tight syringe through the septum inlet and the mixture was stirred at 1,200 rpms and 50° C. for 5 minutes at zero (0) psig of nitrogen. 0.122 mg bis(pentamethylcyclopentadienyl)zirconium dimethyl dissolved in 2.0 ml of dry, distilled toluene was injected through the septum inlet into the vessel. Liquid propylene (200 cc) was added from a calibrated addition vessel resulting in a propylene pressure of 153 psig. Thereafter ethylene at 25 psig was passed into the vessel for 90 minutes while maintaining the temperature at 50° C. at which time the reaction was stopped by rapidly venting and cooling. 76 gms of polyethylene which analyzed for 3.4% propylene and having a $\overline{M}n$ of 15,300 and a $\overline{M}w$ Example 1(a).

EXAMPLE 1(c)

Use of One Metallocene-bis(cyclopentadienyl)Tidiphenyl

A 1-liter stainless steel pressure vessel, equipped with an incline blade stirrer, an external water jacket for temperature control, a septum inlet and vent line, and a regulated supply of dry ethylene, propylene and nitrogen, was dried and deoxygenated with a nitrogen flow. 400 cc of dry, degassed toluene was introduced directly into the pressure vessel. 25 cc of 0.64 molar (in total aluminum) alumoxane was injected into the vessel by a gas tight syringe through the septum inlet and the mixture was stirred at 1,200 rpms and 50° C. for 5 minutes at zero (0) psig of nitrogen. 1.04 mg bis(cyclopentadienyl) titanium phenyl dissolved in 2.0 ml of dry, distilled toluene was injected through the septum inlet into the vessel. Liquid propylene (200 cc) was added from a calibrated addition vessel resulting in a propylene pressure of 165 psig. Thereafter ethylene at 25 psig was passed into the vessel for 90 minutes while maintaining the temperature at 50° C. at which time the reaction was stopped by rapidly venting and cooling. 14.4 gms of polyolefin which analyzed for 65% ethylene and 35% propylene and having a $\overline{M}n$ of 45,400 and a $\overline{M}w$ of 137,000 was recovered. The analysis was performed as in Example 1(a).

EXAMPLE 2

Use of Two Different Metallocenes

A 1-liter stainless steel pressure vessel, equipped with an incline blade stirrer, an external water jacket for temperature control, a septum inlet and vent line, and a regulated supply of dry ethylene, propylene and nitrogen, was dried and deoxygenated with a nitrogen flow 400 cc of dry, degassed toluene was introduced directly into the pressure vessel 10.0 cc of 0.83 molar (in total aluminum) alumoxane was injected into the vessel by a gas tight syringe through the septum inlet and the mixture was stirred at 1,200 rpms and 80° C. for 5 minutes at zero (0) psig of nitrogen 2.127 mg bis(pentamethylcyclopentadienyl) zirconium dichloride dissolved in 2.0 ml of dry, distilled toluene was injected through the septum inlet into the vessel. Similarly, 0.2628 mg bis(methylcyclopentadienyl) zirconium dichloride in 0.25 ml dry, distilled toluene was injected. The solution was saturated with propylene at a pressure of 111 psig for 15 seconds. Thereafter ethylene at 15 psig was passed into the vessel for 20 minutes while maintaining the temperature at 80° C. and the pressure at 126° psig at which time the reaction was stopped by rapidly venting and cooling. 18.0 gms of a blend of PE and EPR copolymer analyzed for 7.1 mole % propylene and having a $\overline{M}n$ of 2,000 and a $\overline{M}w$ of 8,300 was recovered. A fractionation analysis was performed by stirring a 10 g portion of this solid product for one hour in 100 ml of toluene. The slurry was filtered and washed with 10 ml of fresh toluene. The copolymer in solution and the solid product were separately evaporated to dryness, weighed and analyzed by GPC and IR.

The soluble product (7.0 g) had a $\overline{M}n$ of 2,200 and a $\overline{M}w$ of 11,900 and analyzed for 30 mole % propylene. The insoluble fraction had an $\overline{M}n$ of 3000 and a $\overline{M}w$ of 7,400 and analyzed to contain 4.8% propylene.

EXAMPLE 3

A 1-liter stainless steel pressure vessel, equipped with an incline blade stirrer, an external water jacket for temperature of dry ethylene, propylene and nitrogen, was dried and deoxygenated with a nitrogen flow. 400 cc of dry, degassed toluene was introduced directly into the pressure vessel 10 cc 8 of alumoxane molar (8.3 m moles in total aluminum) was injected into the vessel by a gas tight syringe through the septum inlet and the mixture was stirred at 1,200 rpms and 50° C. for 5 minutes at zero (0) psig of nitrogen. 0.539 mg bis(methylcyclopentadienyl) zirconium dimethyl dissolved in 2.0 ml of dry, distilled toluene was injected through the septum inlet into the vessel. Similarly, 1.03 mg bis(pentamethylcyclopentadienyl) zirconium dichloride in 2.0 ml dry, distilled toluene was injected. The solution was saturated with 200 cc propylene at a pressure of 111 psig for 15 seconds. Thereafter ethylene at 25 psig liquid ratio=16) was passed into the vessel for 20 minutes while maintaining the temperature at 50° C. at which time the reaction was stopped by rapidly venting and cooling. 30.0 gms of a blend of LLDPE and EP copolymer analyzed for 3.6% propylene and having a $\overline{M}n$ of 5,600 and a $\overline{M}w$ of 17,300 was recovered. The fractionation analysis, GPC & IR performed as in Example 2 yielded 3.0 gms of a soluble fraction having a $\overline{M}n$ of 3,500, a $\overline{M}w$ of 16,000 and mole % of $C_3$= of 20.6. The insoluble fraction (7.0 gms) had a $\overline{M}n$ of 5,400, a $\overline{M}w$ of 16,400 and mole % $C_3$= of 2.9%.

The invention claimed is:

1. A homogeneous catalyst system for the simultaneous production of a polymer blend in a single polymerization reactor of two or more polymers comprising homopolyethylene and an ethylene-alpha-olefin copolymer, said catalyst comprising (a) at least two different mono, di or tricyclopentadienyls and their derivatives of a Group 4b, 5b and 6b transition metal each having different reactivity ratios and (b) an alumoxane.

2. A homogeneous catalyst system for the simultaneous production of a polymer blend in a single polymerization reactor of two or more polymers comprising polyethylene and an ethylene-alpha-olefin copolymer, said catalyst comprising:

(a) at least two metallocenes represented by the general formula $(C_5R'_m)_pR'_s(C_5R'_m)MeQ_{3-p}$ or $R''_s(C_5R'_m)_2MeQ$; each having different reactivity ratios, and (b) and alumoxane wherein $(C_5R'_m)$ is a cyclopentadienyl or substituted cyclopentadienyl, each R' which can be the same or different is hydrogen or a hydrocarbyl radical such as alkyl, alkenyl, aryl, alkylaryl, or arylakyl radicals having form 1 to 20 carbon atoms or two carbon atoms are joined together to form a $C_4$-$C_6$ ring, R" is a $C_1$-$C_4$ alkylene radical, a dialkyl germanium or silicone, or an alkyl phosphine or amine radical bridging two $(C_5R'_m)$ rings, Q is a hydrocarbon radical such as aryl, alkyl, alkenyl, alkylaryl, or arylakyl radicals having from 1-20 carbon atoms or halogen and can be the same or different, Q' is an alkylidene radical having from 1 to about 20 carbon atoms, Me is a transition metal of Group 4b, 5b and 6b, s is 0 or 1, p is 0, 1 or 2, when p=0, s=0, m is 4 when s is 1, m is 5 when s is 0.

3. The catalyst system of claim 2 wherein Me is selected from zirconium and titanium.

4. The catalyst system of claim 3 wherein Q is selected from the group consisting of methyl, phenyl or chloride.

5. The catalyst system of claim 3 comprising at least 2 zirconocenes.

6. The catalyst system of claim 3 comprising at least 1 titanocenes and 1 zirconocene.

7. The catalyst system of claim 4 comprising bis(methylcyclopentadienyl) zirconium dichloride and bis(pentamethylcyclopentadiethyl)zirconium dichloride.

8. A process for the simultaneous production in a single polymerization reactor of a blend of two or more polymers comprising polyethylene and ethylene-alpha-olefin copolymer comprising polymerizing ethylene and at least one alpha-olefin simultaneously in the presence of the catalyst system of claim 1.

9. A process for producing a reactor blend comprising polymerizing ethylene and at least one alpha-olefin simultaneously in the presence of the catalyst system of claim 2.

10. A process for producing a reactor blend comprising polymerizing ethylene and at least one alpha-olefin simultaneously in the presence of the catalyst system of claim 3.

11. A process for producing a reactor blend comprising polymerizing ethylene and at least one alpha-olefin simultaneously in the presence of the catalyst system of claim 4.

12. A process for producing a reactor blend comprising polymerizing ethylene and at least one alpha-olefin simultaneously in the presence of the catalyst system of claim 5.

13. A process for producing a reactor blend comprising polymerizing ethylene and at least one alpha-olefin simultaneously in the presence of the catalyst system of claim 6.

14. A process for producing a reactor blend comprising polymerizing ethylene and at least one alpha-olefin simultaneously in the presence of the catalyst system of claim 7.

15. The process of claim 8 wherein the polymer blend comprises a blend of polyethylene and an ethylene-propylene copolymer.

16. The process of claim 15 wherein the polyethylene is linear low density polyethylene.

17. The process of claim 15 wherein the polyethylene is high density polyethylene.

* * * * *